United States Patent Office 3,444,124
Patented May 13, 1969

3,444,124
THERMOSETTING ACRYLIC LACQUERS
Pierre Talet, Alfortville, France, assignor to Nobel-Bozel,
Paris, France, a joint-stock company of France
No Drawing. Filed Aug. 10, 1966, Ser. No. 571,418
Claims priority, application France, Aug. 26, 1965,
29,593
Int. Cl. C08f 15/02; C08g 45/04, 37/32
U.S. Cl. 260—33.4                                10 Claims

ABSTRACT OF THE DISCLOSURE

A new thermosetting acrylic lacquer is provided comprising an acrylic copolymer of acrylamidoglycolic acid and at least one monomer of an acrylic ester, acrylamide, or acrylic acid. In addition, a small proportion of symmetrical tetraallyloxyethane may also be included. These lacquers may be crosslinked utilizing an epoxy or an aminoplastic resin cross linking agent at 130° C. compared with the required temperature of 180° C. for similar lacquers without acrylamidoglycolic acid. Finishes produced by lacquers containing acrylamidoglycolic acid have excellent mechanical properties and a remarkable resistance to chemical agents and solvents.

---

The object of the present invention is new thermosetting acrylic lacquers, including an acrylic copolymer in admixture with a resin permitting cross-linking.

The new acrylic lacquers are characterized in that the acrylic copolymer used in their preparation includes, apart from the conventional components, acrylamidoglycolic acid of the formula:

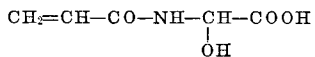

or a remainder of this acid or the reaction product of an acrylic compound and the said acid. An epoxy and/or an aminoplastic resin is added to permit cross-linking.

It has been found that the presence of acrylamidoglycolic acid gives considerable advantages: the lacquers of the present invention may be cross-linked at 130° C. whereas with lacquers of the same composition but without acrylamidoglycolic acid the heating temperature required is 180° C.; furthermore, finishes obtained with the present invention have excellent mechanical properties and a remarkable resistance to chemical agents and solvents.

The proportion of acrylamidoglycolic acid is advantageously in the range of from 10% to 40% by weight based on the whole amount of acrylic products used.

In addition to acrylamidoglycolic acid it is advantageous to add a little tetraallyloxyethane of the formula:

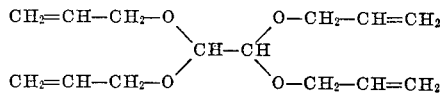

to the standard mixture. The lacquers thus obtained have the same exceptional characteristics as those mentioned hereinabove, but are furthermore characterized by greater flexibility and a better resistance to detergents.

The proportion of tetraallyloxyethane is advantageously in the range of 0.2% to 1% by weight based on the total amount of acrylic products used.

To prepare the acrylic copolymer of the invention acrylamidoglycolic acid and possibly a little tetraallyloxyethane are placed in contact during heating with standard acrylic compounds such as acrylate of ethyl, acrylamide, acrylic acid and the like, in the presence of styrene and other components such as lauryl-mercaptan, benzoyl peroxide (catalyst); and in the presence of solvents such as: butanol, xylene and the like.

The acrylic copolymer obtained is mixed with the epoxy and/or aminoplastic resin and the other components of the paint, such as titanium oxide (rutile) and solvents.

The proportion of conventional acrylic compounds such as acrylate of ethyl, acrylamide, acrylic acid and the like, is advantageously comprised between 10% and 30% by weight relative to the total solid content of the lacquer.

The paint is applied to test bars which are stoved at 130° C. Tests for judging the quality of the paint are carried out on a film of paint in the range of between 30 and 40 microns in thickness.

In order to make it easier to understand the invention some non-limitative examples of its embodiment are given hereinafter. The parts given are parts by weight.

EXAMPLE 1

(A) Preparation of the acrylic copolymer

The following components are heated with reflux for 4 hours:

34.2 parts of acrylamidoglycolic acid at 88%
4 parts acrylic acid
88 parts acrylate of ethyl
15 parts acrylamide
78 parts of styrene
1.3 parts lauryl-mercaptan
2.8 parts benzoyl peroxide
246 parts butanol
44 parts xylene Subsequently a solution of 1.25 parts benzoyl peroxide in 80 parts of xylene is incorporated by portions over a period of from 6 to 8 hours.

A solution of interpolymers is thus obtained having a content of 40% by weight of dry materials.

60 parts of a mixture of formaldehyde-butanol containing 30% of formaldehyde are added and azeotropic entrainment is carried out until the temperature reaches 113° C.

The solvents are then distilled in vacuum and about 136 parts of them are collected; the acrylic copolymer obtained is adjusted to 50% by weight of dry materials by the addition of xylene.

(B) Preparation of a paint with the said acrylic copolymer 10 parts of the above-mentioned acrylic copolymer are ground for 12 hours in a ball-mill with 41.66 parts of titanium oxide (rutile) and 6.25 parts of solvents (naphtha and butanol solvent). Then 25 parts of acrylic copolymer are added and grinding is carried out for 3 hours (viscosity at AFNOR cut No. 4: about 175 s.). Finally, 65 parts of acrylic copolymer and 13.58 parts of an epoxy resin sold under the name of EPIKOTE 1001 are added, in 50% solution in xylene and the Cellosolve (ethylene glycol monoethylether).

The paint thus obtained contains about 22% of standard acrylic compounds relative to the total solid. It is diluted with xylene until it has a viscosity suited to the method of application.

(C) Determination of the quality of the paint

The paints are applied, by means of a Touzart & Matignon apparatus, onto hardened, scoured steel plates of the following dimensions:

200 x 100 x 1 mm.

A layer of paint is laid on to obtain a thickness of 30 to 40 microns.

Predrying is carried out away from dust for 10 minutes, then the film is cured at 130° C. in a ventilated stove for 30 minutes, the plates are then left in the ambient atmosphere for 24 hours before measuring: this is carried out at a temperature as near to 20° C. as possible.

Quality tests are then carried out (hardness, flexibility, resistance to shock, adhesiveness, brilliancy, resistance to detergents, resistance to hot grease, resistance to solvents, etc.).

Hardness, for instance, is measured by the Persoz pendulum on an area having a thickness of between 30 and 40 microns. The three measurements taken are averaged. The difference between each measurement should not be greater than 5 seconds.

Flexibility is measured by means of an Ericksen apparatus (Touzart & Matignon). It is expressed in millimeters of driving in required to break the film.

To measure resistance to shock, a painted plate is deformed by being struck with a hemispheric punch with an adjustable drop. The apparatus used, made by Touzart & Matignon, is graduated from 0 to 50.

A test is made, with the paint on the outside of the protuberance: this is the first figure shown; then a second test is made with the paint inside the protuberance; this is the second figure shown. These figures express the drop (in centimetres) beyond which the finish is seen to crack.

The results of tests are as follows:

Hardnesss _____ minutes__ 4.35
Flexibility _____ 5.5
Resistance to shocks _____ 30; 50

The film is bright, has good adherence to cross-cutting, good resistance to detergent, etc.

EXAMPLE 2

(A) Preparation of the acrylic copolymer

This is done as in Example 1 except that, in addition, 0.6 part of tetra-allyloxyethane are added to the mixture of components to be heated with reflux for 4 hours.

By continuing exactly as in Example 1 an acrylic copolymer with 50% by weight of dry materials is obtained.

(B) Preparation of a paint with the said acrylic copolymer

This is done exactly as in Example 1.

(C) Determination of the quality of the paint

This is done exactly as in Example 1.
The results of these tests are as follows:

Hardness _____ minutes__ 4.5
Flexibility _____ 8
Resistance to shock _____ 15 to 20; 50

The film is brilliant, has a good resistance to cross-cutting, good resistance to detergents, etc.

EXAMPLE 3

(A) Preparation of the acrylic copolymer

This is carried out exactly as in Example 2.

(B) Preparation of a paint with the said acrylic copolymer 10 parts of acrylic copolymer are ground for 12 hours in a ball mill with 41.66 parts of titanium oxide (rutile) and 6.25 parts of solvents (naphtha and butanol solvent). 25 parts acrylic copolymer are then added and grinding is carried on for 3 hours. Finally, 40.07 parts of acrylic copolymer, 24.93 parts of a melamine resin at 50% (Bozelamine 24.825) and 13.58 parts of Epikote 1001 resin in solution at 50% in xylene and the Cellosolve are added. The paint thus obtained contains about 17% by weight of acrylic compounds relative to the weight of the total solid components.

(C) Determination of the quality of the paint

The operation is carried out exactly as in Example 1.
The results of tests carried out are as follows:

Hardness _____ minutes__ 4.40
Flexibility _____ 8.5
Resistance to shock _____ 18 to 20; 50

The film is brilliant, has good adherence to cross-cutting, excellent resistance to detergents, etc.

EXAMPLE 4

The operation is carried out as in Example 2, but to prepare the paint 0.3% of phosphoric acid on dry basic of the binding agent is added.

The results of tests carried out on a film of paint of from 30 to 40 microns thick after stoving for 30 minutes at 130° C. are as follows:

Hardness _____ minutes__ 4.55
Flexibility _____ 9
Resistance to shocks _____ 30; 50

The film is bright, has good adhesion to cross-cutting, and good resistance to detergents, etc.

I claim:
1. A thermosetting lacquer comprising at least:
  (a) a copolymer of acrylamidoglycolic acid with at least one acrylic compound of an acrylic ester, acrylamide or acrylic acid, said acrylamidoglycolic acid comprising 10–40% by weight of the total amount of said acrylic compound;
  (b) cross-linking agent of an epoxy resin or an aminoplastic resin, said cross-linking agent being present in the range of from 10–60% by weight of said copolymer; and
  (c) a solvent of an aliphatic alcohol or an aromatic hydrocarbon.
2. A thermosetting lacquer in accordance with claim 1 wherein said copolymer further comprises 0.2% to 1% of symmetrical tetraallyloxyethane.
3. A thermosetting lacquer in accordance with claim 1 further comprising an additive of a filler or pigment.
4. A thermosetting lacquer in accordance with claim 3, wherein said acrylic compound comprises 10–30% by weight of the solid content of said lacquer.
5. A thermosetting lacquer in accordance with claim 4 wherein said additive comprises rutile and said solvent comprises xylene.
6. A thermosetting lacquer in accordance with claim 5 wherein said copolymer further comprises 0.2% to 1% of symmetrical tetraallyloxyethane based on the total acrylic compounds used.
7. A thermosetting lacquer in accordance with claim 1 wherein said acrylic compound is ethyl acrylate, acrylamide or acrylic acid.
8. A process for producing a thermosetting lacquer comprising reacting an acrylic compound of ethyl acrylate, acrylamide or acrylic acid together with 10–40% by weight based on said acrylic compound of acrylamidoglycolic acid under polymerization conditions in the presence of a polymerization catalyst and a solvent of an aromatic hydrocarbon or an aliphatic alcohol, and adding a cross-linking agent of an epoxy resin or an aminoplastic resin.
9. A process in accordance with claim 8, wherein said polymerization reaction is further carried out in the presence of symmetrical tetra-allyloxyethane in an amount of 0.2 to 1% by weight based on the total amount of the acrylic products used.
10. A process for curing a composition comprising at least:
  (a) a copolymer of acrylamidoglycolic acid with at least one acrylic compound of an acrylic ester, acrylamide or acrylic acid, said acrylamidoglycolic acid comprising 10–40% by weight of the total amount of said acrylic compound;

(b) a cross-linking agent of an epoxy resin or an aminoplastic resin, said cross-linking agent being present in the range of from 10–60% by weight of said copolymer; and (c) a solvent of an aliphatic alcohol or an aromatic hydrocarbon consisting of heating said composition to 130° C.

References Cited

UNITED STATES PATENTS

| | | |
|---|---|---|
| 3,183,282 | 5/1965 | Hurwitz _____ 260—851 |
| 3,197,447 | 7/1965 | Talet. |
| 3,378,601 | 4/1968 | Tanaka et al. |

MORRIS LIEBMAN, *Primary Examiner.*

H. H. FLETCHER, *Assistant Examiner.*

U.S. Cl. X.R.

260—33.6, 86.1, 534, 615, 834, 836, 851